April 2, 1963   A. K. LAWRENCE   3,083,681
ALARM SYSTEM FOR HAY BALERS AND THE LIKE
Filed April 3, 1961
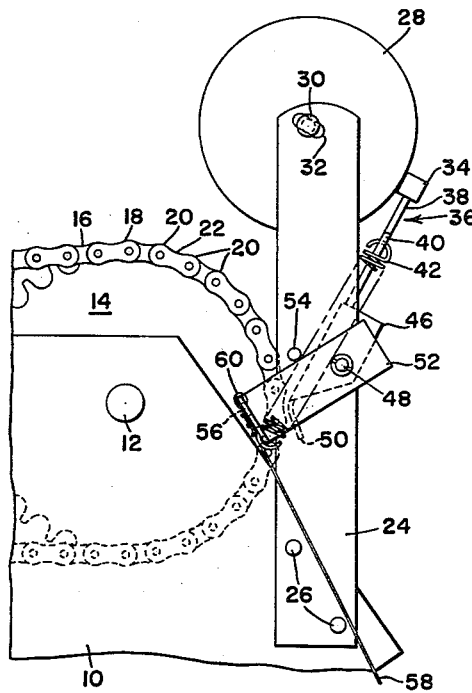
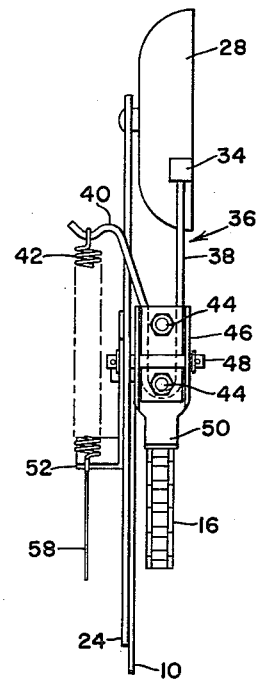
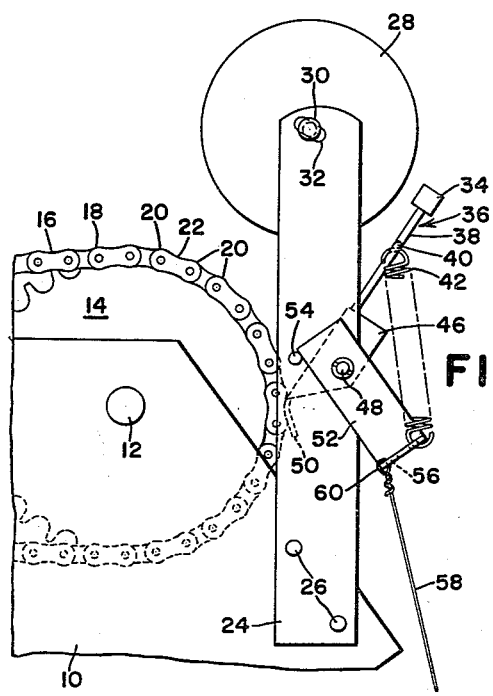
INVENTOR.
A. K. LAWRENCE 3,083,681
ALARM SYSTEM FOR HAY BALERS
AND THE LIKE
Allan K. Lawrence, Ottumwa, Iowa, assignor to Deere & Company, Moline, Ill., a corporation of Delaware
Filed Apr. 3, 1961, Ser. No. 100,249
4 Claims. (Cl. 116—60)

This invention relates to an alarm system and more particularly to such system as applied to agricultural machinery such as hay balers and the like.

Hay balers as commercially known employ either wire or twine as a tying medium for binding the bales that are automatically formed thereby. Such baler will conventionally carry as many balls of twine or coils of wire as there are bands of either of these media tied around each bale. For example, in a two-wire machine, two coils of wire are used and are fed along separate paths to the tying mechanism. If the machine is of the three-wire type, then three coils are employed. The same is true of two- and three-twine machines. In all cases, the problem is the same; that is, the tying medium is consumed as the bales are formed and tied and when this occurs without the knowledge of the operator, bales will still be accumulated and formed but of course will not be tied. Moreover, when the defect is discovered, the operator must stop the machine and rethread the entire tying mechanism. Therefore, it becomes desirable to provide some form of alarm or signal which will inform the operator in advance that the supply of tying medium is at or near its end. According to the present invention, a simplified alarm system is provided in the form of a device readily attachable to balers and like machines of existing types. It is a further object of the invention to provide the alarm in the form of a gong or bell which is rung by a clapper actuated from a moving part of the machine. A further feature of the invention resides in actuating means for the clapper which is connected to the tying medium so that as long as this medium is in adequate supply the clapper is held in an inoperative condition, but, when the tying medium supply runs out or is about to run out, the clapper is actuated to an operative condition in which it is actuated by the moving part of the machine. A further feature of the invention resides in a simple over-center device which is shiftable between first and second conditions in which it respectively incurs the inoperative and operative conditions of the clapper or its actuating means.

The foregoing and other important objects and desirable features inherent and encompassed by the invention will become apparent as a preferred embodiment thereof is disclosed in detail in the ensuing description and accompanying sheet of drawings, the figures of which are described below.

FIG. 1 is a fragmentary side view of the alarm device, shown attached to representative hay baler structure, the view illustrating the clapper in its inoperative condition.

FIG. 2 is a similar view but illustrates the clapper in operative condition.

FIG. 3 is an end view of the structure shown in FIG. 1.

The numeral 10 represents by way of illustration a structural or frame part of a typical baler, in which is journalled a shaft 12. A sprocket 14 is keyed to the shaft and is driven by a link or roller chain 16. This may be representative of any driven part of the machine and presents a moving surface, such as at 18, which surface has provided thereon a continuous series of projections, in this case established by the shape of the links which have convex portions 20 interspaced with concave portions 22.

The alarm device may comprise a support in the form of a bracket 24 having means thereon such as bolts 26 for affixation thereof to the baler frame portion 10 in proximity to the drive part represented by the chain and sprocket.

This support has mounted at its upper end a bell or gong 28, the mounting of which may include a bolt 30 and slot 32 to provide for adjustment of the gong relative to a clapper 34 which is fixedly carried at the upper end of an arm 36. This arm preferably comprises an upper portion in the form of a "hairpin" having opposite legs 38 and 40, the former of which carries the clapper 34 and the latter of which forms a hook for anchoring one end of a coiled tension spring 42. The bight portion of the hairpin is rigidly attached in any suitable manner, as by a pair of bolts 44 to a follower member 46 which establishes the lower end of the arm 36. The hairpin portion of the arm is preferably formed of relatively heavy spring steel wire to add resilience to the action of the clapper 34.

The arm 36 is mounted on the support by means of a transverse pivot pin 48 for angular positioning between the positions of FIGS. 1 and 2. In the former, it will be seen that the tail 50 of the follower 46 is clear of the chain 16 so that the chain will travel in its normal path without any effect on the alarm system. In FIG. 2, the position of the arm 36 has changed to the extent that the tail 50 now rides the moving surface 18 of the chain. Therefore, the arm 36, and consequently the clapper 34, will be vibrated and the clapper 34 will intermittently strike the gong 28.

To provide for the selective positioning of the arm 36, the device includes control means in the form of a member 52 shiftable between what may be regarded as inactive and tripping positions, the former of which is shown in FIG. 1 and the latter of which is shown in FIG. 2. Mounting of the member 52 for shifting between these two positions is here accomplished by utilizing the pivot pin 48 on which the arm 36 is pivoted. The end of the spring 42 opposite to its end which is connected to the hook 40 on the arm 36 is connected to the end of the member 52 downwardly remote from the pivot 48, which end of the member is turned outwardly and apertured for this purpose. When the member 52 is in the position shown in FIG. 1, it engages a stop 54, and the line of force exerted by the spring 42 between the hook 40 and the lower end of the member 52 is to the left of the pivot 48, thus establishing an over-center condition as respects this pivot. When the member 52 is swung to the FIG. 2 position, its upper end encounters the stop 54 and the line of force of the spring swings to the other side of the pivot 48. In other words, in FIG. 1, the line of force exerted by the spring 42 is effective to swing the arm 36 in a counterclockwise direction so as to disengage the actuator portion or tail 50 from the chain, whereas in FIG. 2 just the opposite result occurs.

It remains only to describe the manner in which the positioning of the member 52 is made responsive to the running out of the tying medium. For this purpose, the lower end of the member 52, in addition to having an aperture for the connection of the lower end of the spring 42, has a second aperture 56 which affords means for connection to the tying medium, here indicated as a wire 58 having its terminal end loosely tied at 60 to the member 52 via the aperture 56. As will be well understood by those versed in the art, the other end of the wire 58 proceeds to the coil and thence to the tying mechanism. As the wire supply continues to be used up by the machine in the tying operation, wire continues to be drawn from the coil until all that is left is only the remaining portion extending between the tying mechanism and the control member 52, and ultimately tension is placed on this portion of the wire, here represented by the wire 58, sufficient to swing the member 52 over center, changing the position of the spring from that of FIG. 1 to that of FIG. 2 and consequently changing the position of the clapper arm 36. Since the chain 16 is continuously running, achievement of the FIG. 2 position will cause the tail 50 of the follower 46 to ride the chain and the projection 20 on the chain will cause vibration of the clapper to strike the gong 28, thus signalling to the operator that ultimate consumption of the wire is at hand. When a new coil of wire is added to the machine, its beginning end may be attached to the final end of the wire 58 and the final end of the new coil will be attached to the member 52 at 60. It is significant that the connection at 60 be made of such nature that it is secure enough to trip the member 52 but is loose enough to enable the wire 58 to pull away from the member 52 so as to avoid undue tension in the wire 58 or even breakage of the wire between the member 52 and the tying mechanism.

It will be apparent of course that when a new coil of wire is added, the member 52 is reset to the position of FIG. 1 and the alarm again becomes inactive or inoperative. It will be further evident that the arrangement can be employed with twine or any other form of tying medium having the characteristics of wire and twine as described herein.

Features and advantages of the invention, other than those categorically enumerated here, will readily occur to those versed in the art, as will many modifications and alterations in the preferred embodiment disclosed here, all of which may be achieved without departure from the spirit and scope of the invention.

What is claimed is:

1. An alarm for hay balers and the like having frame means and a drive part including a link chain presenting a moving surface having a series of projections thereon, comprising: a support having means for the affixation thereof to the frame means adjacent to the chain; a gong carried by the support; an arm carried intermediate its ends on the support on a pivot and having one end adjacent to the gong and provided with a clapper and having its other end adjacent to the chain and provided with a chain follower, said arm having an inoperative position in which the follower is clear of the chain and the projections thereon and an operating position in which said follower rides the chain to be vibrated by said projections to incur striking of the gong by the clapper; a control member; a spring connected between the arm and the member; means mounting the member on the support for movement between an inactive position, in which the spring exerts force along a line to one side of the arm pivot to incur the inoperative position of the arm, and an active position in which the line of force of the spring is shifted to the other side of said pivot so as to incur the operating position of said arm; and means on the member for connection to the tying medium of the baler to derive force therefrom for moving said member from its inactive position to its tripping position.

2. An alarm for hay balers and the like having frame means and a drive part presenting a moving surface having a series of projections thereon, comprising: a support having means for the affixation thereof to the frame means adjacent to the drive part; a gong carried by the support; an arm carried intermediate its ends on the support on a pivot and having one end adjacent to the gong and provided with a clapper and having its other end adjacent to the chain and provided with a drive part follower, said arm having an inoperative position in which the follower is clear of the chain and the projections thereon and an operating position in which said follower rides the drive part to be vibrated by said projections to incur striking of the gong by the clapper; a control member; a spring connected between the arm and the member; means mounting the member on the support for movement between an inactive position, in which the spring exerts force along a line to one side of the arm pivot to incur the inoperative position of the arm, and an active position in which the line of force of the spring is shifted to the other side of said pivot so as to incur the operating position of said arm; and means on the member for connection to the tying medium of the baler to derive force therefrom for moving said member from its inactive position to its tripping position.

3. An alarm for hay balers and the like having frame means and a drive part presenting a moving surface having a series of projections thereon, comprising: a support having means for the affixation thereof to the frame means adjacent to the drive part; a gong carried by the support; clapper means movable on the support for striking the gong; actuating means connected to the clapper means and shiftable into and out of engagement with the drive part; and control means connected to the actuating means for normally causing the clapper means to be out of engagement with the drive means, said control means being shiftable and having means for connection to the tying medium of the baler to derive force therefrom for causing the actuating means to engage and be vibrated by the drive part.

4. An alarm for hay balers and the like having frame means and a drive part presenting a moving surface having a series of projections thereon, comprising: a support having means for the affixation thereof to the frame means adjacent to the drive part; a gong carried by the support; clapper means movable on the support for striking the gong; actuating means connected to the clapper means and shiftable into and out of engagement with the drive part; over-center means connected between the support and the actuating means and shiftable to opposite sides of dead center to respectively hold the actuating means in and out of engagement with the drive part; and control means connected to the actuating means and having means for connection to the tying medium of the baler to derive force therefrom for causing the actuating means, while out of engagement with the drive part, to shift toward the drive part and to be carried by the over-center means into engagement with and to be vibrated by the drive part.

References Cited in the file of this patent

UNITED STATES PATENTS

| | | |
|---|---|---|
| 1,288,654 | Miles | Dec. 24, 1918 |
| 2,781,018 | McClellan | Feb. 12, 1957 |